United States Patent
Leydier et al.

(10) Patent No.: US 6,543,690 B2
(45) Date of Patent: Apr. 8, 2003

(54) METHOD AND APPARATUS FOR COMMUNICATING WITH A HOST

(75) Inventors: Robert Antoine Leydier, La Bastide (FR); Alain Christophe Pomet, Austin, TX (US)

(73) Assignees: Schlumberger Malco, Inc., Owings Mills, MD (US); STMicroelectronics, Inc., Carrollton, TX (US)

( * ) Notice: Subject to any disclaimer, the term of this patent is extended or adjusted under 35 U.S.C. 154(b) by 205 days.

(21) Appl. No.: 09/729,113

(22) Filed: Dec. 4, 2000

(65) Prior Publication Data

US 2002/0066791 A1 Jun. 6, 2002

(51) Int. Cl.⁷ .......................... G06K 7/08; G06K 19/06
(52) U.S. Cl. ....................................... 235/451; 235/492
(58) Field of Search ............................... 235/451, 492; 710/15; 327/108

(56) References Cited

U.S. PATENT DOCUMENTS

| | | | | |
|---|---|---|---|---|
| 5,767,844 A | * | 6/1998 | Stoye | 345/168 |
| 5,905,389 A | | 5/1999 | Alleven | |
| 5,912,569 A | | 6/1999 | Alleven | |
| 6,076,119 A | | 6/2000 | Maemura et al. | |

OTHER PUBLICATIONS

USB–Implementers Forum Inc: "Universal Serial Bus Specification—Revision 2.0" Universal Serial Bus Specirfication, XX, XX Apr. 27, 2000, pp. 118–170, XP002169502.
Patent Abstracts of Japan vol. 2000, No. 14, Mar. 5, 2001 & JP 2000 305676 A (Fuji Photo Film Co Ltd), Nov. 2, 2000 abstract.
WO OO 34878 A (Advanced Micro Devices Inc) Jun. 15, 2000 abstract; figure 3 claims 1–7.
"Design Guide for a Low Speed Buffer for the Universal Serial Bus," Revision 1.1, Dec., 1996, Intel Corporation.

* cited by examiner

Primary Examiner—Thien M. Le
Assistant Examiner—Lisa M. Caputo
(74) Attorney, Agent, or Firm—Pehr B. Jansson; Lisa K. Jorgenson

(57) ABSTRACT

A method and apparatus is disclosed for communicating with a host. In one embodiment, a smart card has an IC with voltage conditioning circuitry and a pull-up resistor. The smart card, when inserted in a smart card reader coupled to the host, is capable of signaling the host over a bus using the pull-up resistor selectively coupled to a voltage output of the voltage conditioning circuitry and a first output of the smart card. The voltage conditioning circuitry output is selectively coupled to the first output through the resistor, responsive to the device being powered by the bus but not transmitting. This tends to pull up the first output to the voltage level of the voltage source, which makes the smart card capable of being properly detected by the host upon the bus being driven by a host. Selectively disconnecting the pull-up resistor while the smart card is transmitting or receiving results in a more balanced differential output signal. Since the pull-up resistor and voltage conditioning circuitry supplying the proper voltage to the pull-up resistor are an integrated part of the IC, no separate contact is required to supply voltage to the resistor. This permits the smart card to be compatible with the contact configuration of certain existing smart cards, and eliminates a need for the pull-up resistor or voltage conditioning circuitry to be included in the smart card reader.

27 Claims, 10 Drawing Sheets

METHOD AND APPARATUS FOR COMMUNICATING WITH A HOST

CROSS-REFERENCE TO RELATED APPLICATION

The present application is related to the following U.S. application that is assigned to the same assignees as the present application, and is hereby incorporated herein by reference:

"Method and Device for Local Clock Generation Using Universal Serial Bus Downstream Received Signals DP and DM," filing date Jul. 13, 2000, Ser. No. 09/614,736.

BACKGROUND OF THE INVENTION

1. Field of the Invention

The present invention relates to electronic devices for use with a universal serial bus (USB). More particularly, the invention relates to circuitry that improves common mode performance of transmitters or receivers, such as in USB-compatible devices, and facilitates connection of devices, such as USB devices, to a host.

2. Description of Related Art

A number of standard interfaces exist for communicating between a host and a device. Referring to FIG. 1, a conventional information handling system 100 is shown. The system 100 makes use of the universal serial bus ("USB") 125 for connecting a host computer 170 (also known simply as a "host") to a number of devices, known as USB devices, such as a display 135, printer 140, keyboard 145, trackball 150, optical scanner 155, disk drive 160 and other such device 165. Each one of the devices 135, 140, etc. is coupled to the USB 125 via respective ports 130 of the hub 110.

The USB is currently defined by the Universal Serial Bus Specification written and controlled by USB Implementers Forum, Inc., a non-profit corporation founded by the group of companies that developed the USB Specification. In particular, Universal Serial Bus Specification, revision 1.1, dated Sep. 23, 1998 (the "USB Specification"), Chapter 5 "USB Data Flow Model," Chapter 7 "Electrical," and Chapter 8 "Protocol Layer" are hereby incorporated herein by reference.

According to the USB Specification 1.1, USB devices may include both low speed and full speed devices. Low speed devices transfer data at a transmission rate of 1.5 MHz and full speed devices transfer data at a rate of 12 MHz. Data are transmitted on communication lines. That is, the USB device transmits a differential output signal or receives a differential input signal on these communication lines. In the low speed mode, the differential signal indicates a first logical state, referred to as the "J" state, if D+ is at a voltage level below that of D−, and a second state, the "K" state, if D+ is at a voltage level above that of D−. In the full speed mode, the differential signal indicates a first state, the "K" state, if D+ is at a voltage level below that of D−, and a second state, the "J" state, if D+ is at a voltage level above that of D−. The differential design gives better protection against ground shifts and noise since the received signal level is determined by comparing two voltage levels that are both subject to ground shifts or noise affecting both of the differential signals in a similar manner.

A host 170 detects the presence of a device, such as device 165, on the USB 125 during an attachment phase, while drivers of the port 130 and device are in tri-state. Detection of the attachment is based on a certain connection on the port 130 of a pull-up resistor 210 associated with the device. Likewise, detection of whether the device is operating in low or full speed mode also depends on the pull-up resistor connection.

Referring now to FIG's 2 and 3, FIG. 2 shows a transmitter 230 of a typical USB device, of the low speed variety, coupled to a receiver 240 on the corresponding port 130. FIG. 3 shows a transmitter 230 of a typical USB device, of the full speed variety, coupled to a receiver 240 of the corresponding port 130. The low speed device (FIG. 2) pull-up resistor 210 is connected between positive voltage contact 213 and the D− signal line 212. The full speed device (FIG. 3) has the pull-up resistor 210 connected between the positive voltage contact 213 and the D+ signal line 215. Note that according to the USB Specification, the voltage level of 211 supplying the pull-up resistor is different than that of the specified voltage supplied by the port 130 on the signal line 220 by $V_{BUS}$. Thus, the resistor, for example, which is conventionally external to integrated circuitry of the USB device in the prior art, is supplied by its own voltage contact 213, and not the $V_{BUS}$ line 220, unless additional circuitry is also included coupled to the line 220 to condition the voltage for supplying the pull-up resistor.

The presence of the pull-up resistor on only the D− signal line 212, for low speed peripherals, or on only the D+ signal line 215, for full speed peripherals, introduces an imbalance in the symmetry of the differential signal from the USB transmitter 230, that is, outputs on the signal lines. In other words, due to the resistor, the amplitudes of the signal swings on the signal lines are not the same and the signals do not change at the same rate. This asymmetry is problematic for several reasons, including increases in EMI/RFI radiation, received bit length variation and data stream skew. Aspects of these problems are addressed in U.S. Pat. Nos. 5,905,389 and 5,912,569 (the "Alleven patents") by introducing a delay circuit in one of the two USB transmitters. While this mitigates the problems, it does not fully eliminate the imbalance in the differential signal arising from the single pull-up resistor.

The presence of the pull-up resistor on one of the communication lines also gives rise to other issues. One issue concerns power consumption by the peripheral. U.S. Pat. No. 6,076,119 (the "Maemura et al. patent") introduces a switch between the pull-up resistor and a terminal voltage, wherein the switch selectively disconnects the pull-up resistor when a device is inoperative. This reduces power consumption, and also simplifies determination by a host computer that a physically connected USB device is inoperative, but it does not address the imbalance in differential signal arising from connection of the single pull-up resistor during operation of the device.

Another issue concerns suitability for use of "smart cards" in connection with a USB. Referring now to FIG. 4, a smart card 400 is shown which has an integrated circuit module ("ICM") 420 affixed to a card 410. Although conventional USB peripherals have the USB required pull-up resistor mounted externally, it is problematic to mount a resistor on the surface of a smart card, which is carried in a wallet or purse and repeatedly inserted and removed from a reader. Furthermore, since smart cards compatible with ISO7816 standard are in widespread use in Europe and Asia, legacy issues limit the number of contacts on the smart card which are available for USB applications of smart cards This also gives rise to difficulties in connecting an external resistor to a smart card.

In addition to the above described problems associated with surface mounting and terminal limitations on smart cards, the conventional USB pull-up resistor is also problematic for readers used with smart cards in single-user applications. For relatively centralized applications, such as transactions with payphones, automatic teller machines or point of sale terminals, the number of transactions per smart card reader is high. That is, in these applications each smart card reader is shared by many users, the frequency of transactions per reader is very high, and the cost of the readers is not a major factor. However, smart cards are also useful for widely distributed transactions conducted via the Internet, such as for financial transactions or for logging securely onto a network. For this application, transactions are commonly associated with individual use of computers in homes and offices, and accordingly, smart card readers in this application are used relatively much less frequently, so that the cost per reader is a significant feasibility factor since the solution cost is equal to the smart card reader cost plus the smart card cost.

To overcome the aforementioned problem of USB terminal limitations on ISO7816 compatible smart cards, the use of a conventional USB device's external pull-up resistor requires voltage conditioning circuitry external to the smart card, as described hereinabove. This pull-up resistor and voltage conditioning circuitry is conventionally located in the smart card reader. As has been stated, this is not an issue for a smart card reader shared by many users, but it is quite problematic for a smart card reader used by a single-user in Internet transactions, because it tends to drive up the cost of the smart card solution.

From the above discussion it should be understood that while advances have been made in USB devices, needs still exist for further improvements which address the problems of EMI/RFI radiation, variation in received bit lengths and skew in the received data stream, all of which arise from imbalance in differential USB signaling due to the USB required pull-up resistor. Furthermore, solutions to these problems and other problems related to the pull-up resistor are particularly difficult for smart cards performing as a USB device, so that the needs are particularly acute in this context.

SUMMARY OF THE INVENTION

The foregoing needs are addressed in the present invention. According to a method form of the invention, an apparatus communicates with a host by receiving a voltage at a first voltage level, on a. first one of a number of contacts coupled to an integrated circuit ("IC"). The contacts and the IC are part of a smart card. The received voltage is conditioned, by voltage conditioning circuitry on the IC., The voltage conditioning circuitry generates an output voltage at a second voltage level for signaling attachment to the host. This is signaled by the voltage conditioning circuitry output pulling up a second contact to the second voltage level, through a resistor of the IC. A signal is also driven on the second contact by a driver on the IC for further communicating to the host. That is, in an embodiment, the driver signal is for communication.

In another aspect of the method, the second contact is pulled up to the second voltage level through a switch on the IC, responsive to the apparatus being powered.

In still another aspect of the method, the second voltage level is decoupled from the second contact by the switch, responsive to a detach indication from control circuitry of the IC.

In yet another aspect, the IC also asserts a second driver signal for differential signal communication to the host, on a third one of the contacts. The voltage conditioning circuitry output voltage is decoupled from the second contact by the switch on the IC, responsive to the apparatus transmitting, i.e., transferring data to the host at the USB full or low speed data rate, to reduce an imbalance for the first and second driver signals. Further, the voltage conditioning circuitry output voltage is re-connected to the second contact by the switch, responsive to termination of the transmitting.

In another embodiment, the voltage conditioning circuitry output voltage is decoupled from the second contact by the switch on the IC, responsive to the apparatus receiving, i.e., transferring data from the host at the USB full or low speed data rate, to reduce an imbalance for signals driven by the host. In this embodiment, the voltage conditioning circuitry output voltage is re-connected to the second contact by the switch, responsive to termination of the receiving.

In another method aspect, receiving the voltage at the first voltage level includes receiving the smart card by a reader having solely passive components, and electrically coupling a connector of the reader to the contacts, for coupling the contacts to the host.

According to an apparatus form of the invention, a device has a driver and outputs for communicating with a host. In a first aspect, the device has voltage conditioning circuitry, and a pull-up resistor and is capable of signaling the host over a bus using the pull-up resistor coupled to a first one of the outputs and a voltage output of the voltage conditioning circuitry.

A switch is included in series with the voltage output, pull-up resistor and the aforementioned first output. The switch is capable of selectively connecting the voltage conditioning circuitry output, through the pull-up resistor, to the first output, responsive to the device being powered by the bus, but not transmitting. This tends to pull up the first output to the voltage level of the voltage conditioning circuitry output, which makes the device capable of being properly detected by the host upon the bus being driven by a host.

In the context of a USB embodiment, the device has two drivers for differential outputs and both the outputs are coupled to an output contact pair. One of this contact pair is for the aforementioned first output. Since the other one of the output contact pair has no corresponding pull-up resistor, it is advantageous to disconnect the pull-up resistor while the device drivers are transmitting, since this results in a more balanced differential output signal, and the benefits of less common-mode noise, reduced EMI/RFI, improved bit lengths and reduced skew in the received bit stream.

The pull-up resistor must at times be connected to the output, however. This is because, as described in the Background hereinabove, for USB applications the host determines if the device is attached to the USB and if the device is low speed or full speed by examining D– and D+ signal lines on the USB to which the output terminals of the device may be connected. The invention involves recognition that although the pull-up resistor must be connected for proper detection of the device by the host on the D+ or D– lines, the pull-up resistor can advantageously be disconnected when the device is driving those lines.

In an additional aspect, the apparatus of the invention includes an integrated circuit ("IC"), which is part of a smart card having a number of electrical contacts. (The contacts and the IC are preferably elements of the same integrated circuit module ("ICM").) The IC is coupled to the ICM contacts, including a first output of the IC coupled to a first one of the ICM contacts for receiving a voltage supply from a USB port. The IC includes voltage conditioning circuitry coupled to a second one of the ICM contacts through a resistor of the IC.

In still another aspect, the apparatus includes a reader, having a connector for receiving the smart card and coupling connector contacts to the smart card contacts. Electrical components of the reader consist solely of passive components, that is, inactive components having resistance, inductance or capacitance characteristics, but no gain or directional function.

It is an advantage that the pull-up resistor and voltage conditioning circuitry supplying the proper voltage to the pull-up resistor are integrated on the IC, so no contact is required on the smart card to supply the voltage to the resistor. This permits the apparatus to be compatible with the contact configuration of existing smart cards.

It is still another advantage that the resistor being an integrated resistor of the IC eliminates the need for including the pull-up resistor or any voltage conditioning circuitry for the resistor as part of the reader, making the reader more suitable for low cost applications.

These and other advantages of the invention will be further apparent from the following drawings and detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

In the following detailed description of the preferred embodiments, reference is made to the accompanying drawings illustrating embodiments in which the invention may be practiced. It should be understood that other embodiments may be utilized and changes may be made without departing from the scope of the present invention.

Figure 4:
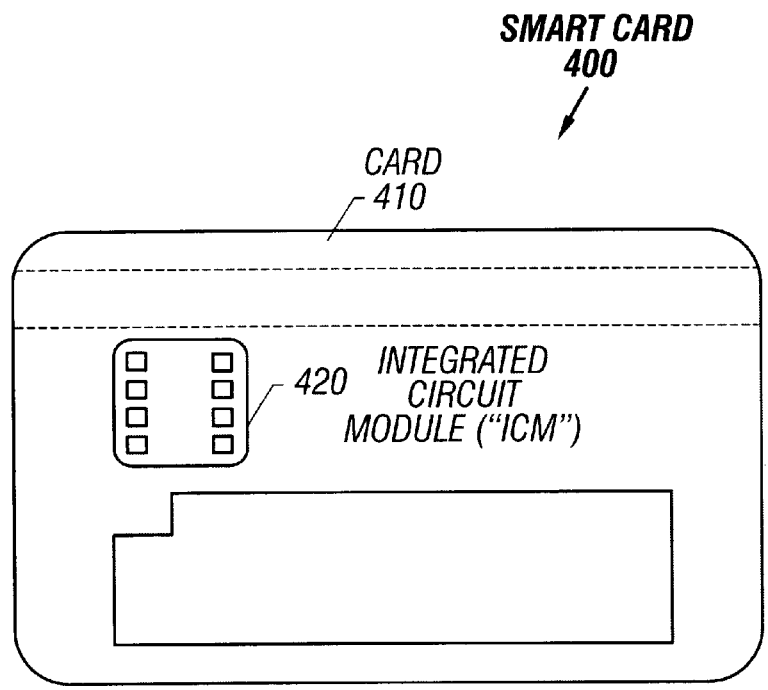
FIG. 4 illustrates a conventional smart card.
Figure 5:
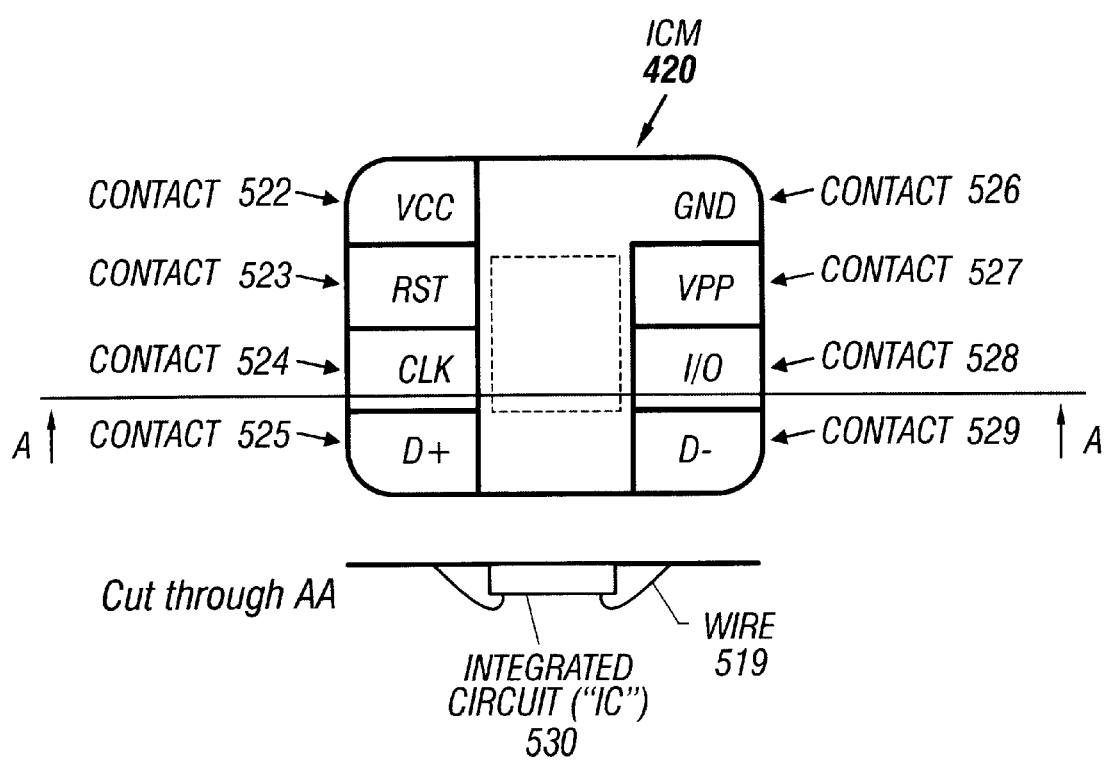
FIG. 5 illustrates details of an integrated circuit module according to the present embodiment.

Referring to FIG. 5, an ICM 420, according to an embodiment of the present invention, is shown in more detail than the conventional ICM 420 shown in FIG. 4. In particular, electrical contacts 522 through 529 are shown. These electrical contacts 522 through 529 associated with the ICM 420 of the smart card are coupled via wires 519 to an IC 530 of the ICM 420, and are used for the host to communicate with the IC by inserting the card into a reader 600 (not shown).

Figure 1:
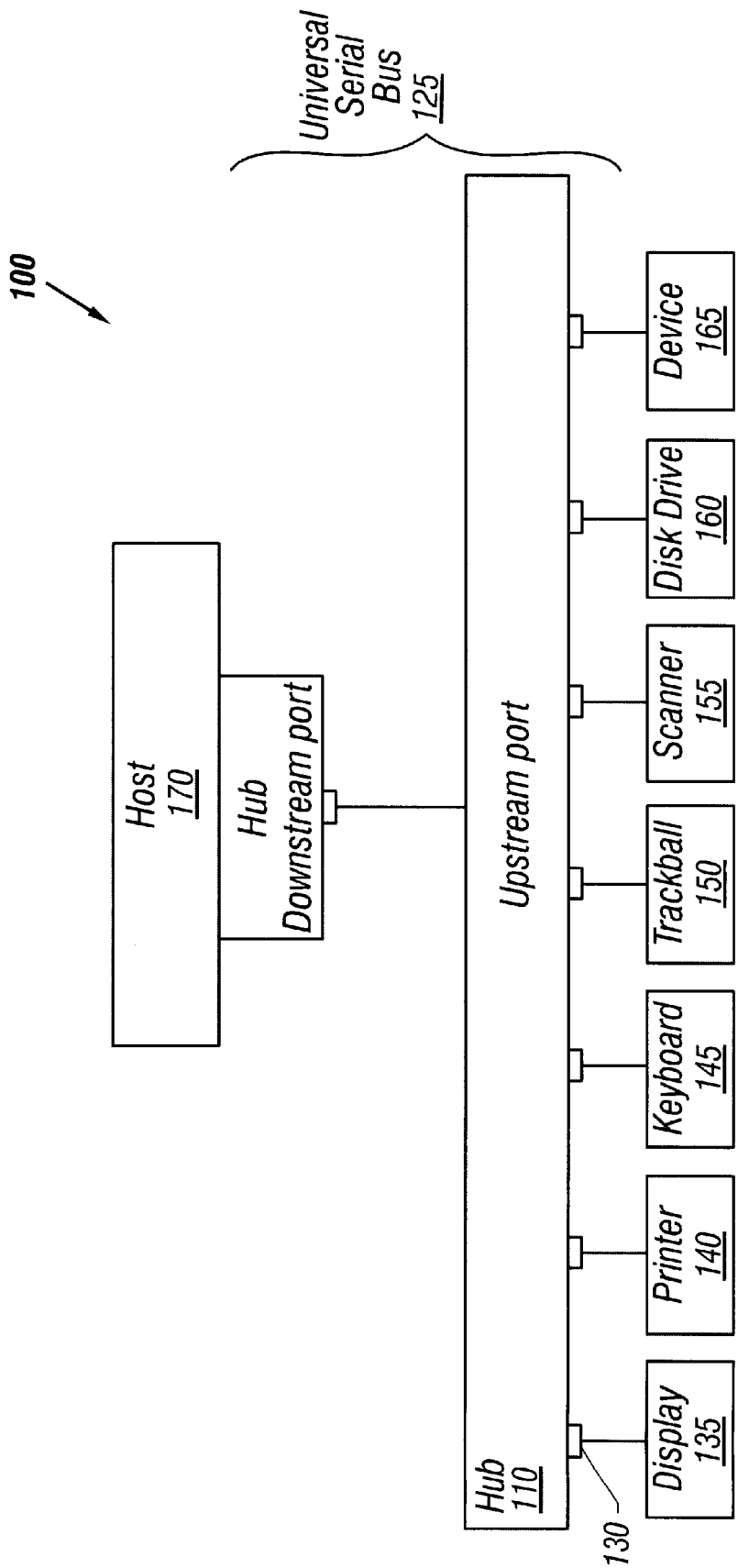
FIG. 1 illustrates a conventional information handling system, with universal serial bus and USB devices.
Figure 6:
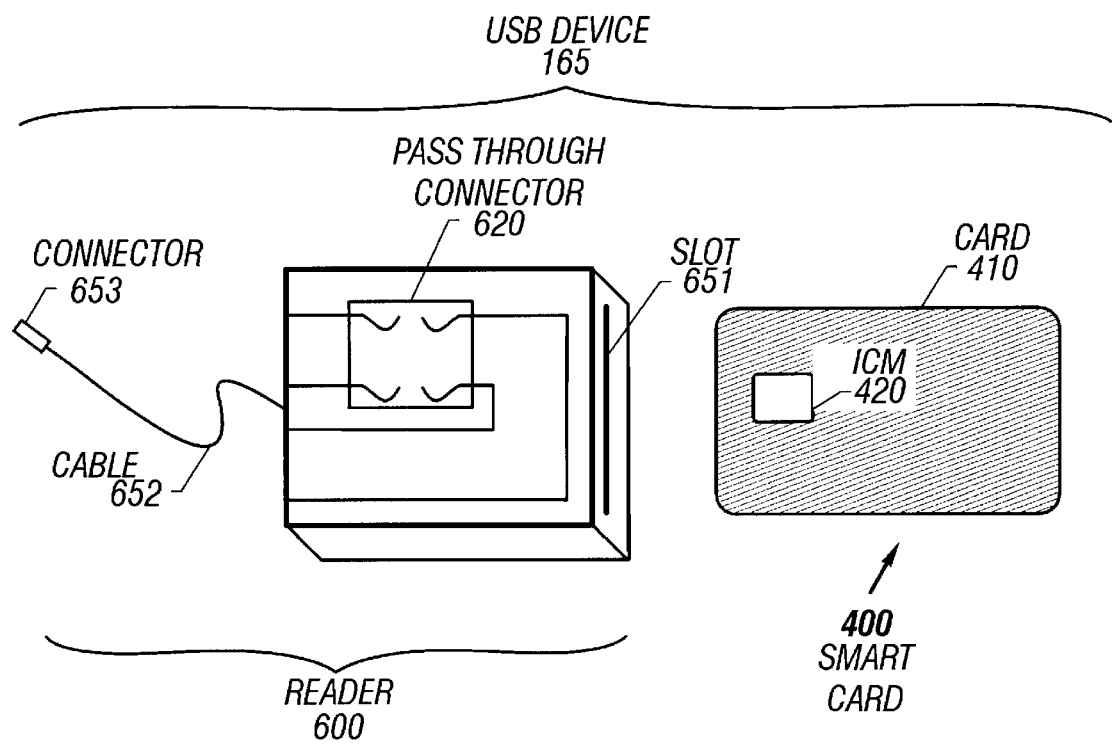
FIG. 6 shows a smart card reader according to an embodiment of the present invention.

Referring to FIG. 6, a smart card 400 is shown with an embodiment of the USB compatible reader 600. The reader 600 has a slot 651 for receiving the card 410 which includes the ICM 420. The reader 600 includes a cable 652 and connector 653 for connecting the reader 600 to the port 130 (FIG. 1) on hub 110 (FIG. 1). The reader 600 includes a passthrough connector 620. The combination of the reader 600 and the smart card 400 of the present embodiment can be used as a smart card USB device, such as device 165 in FIG. 1.

Figure 7:
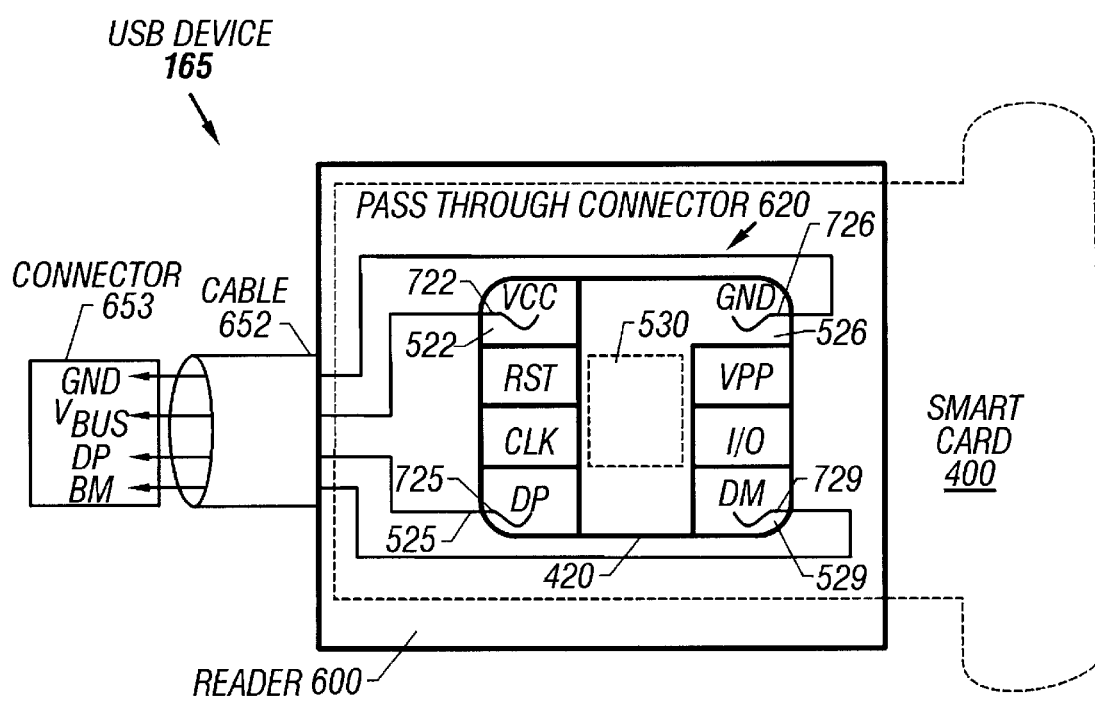
FIG. 7 shows details of the reader of FIG. 6.

Referring to FIG. 7, further details are shown of the device 165. The reader 600 has a passthrough connector 620 with contacts 722 through 729, which make contact with the contacts 522 through 529 of the smart card 400, and couples them to bus 125 (FIG. 1) via the cable 652 and connector 653, plugged into the port 130 (FIG. 1). Only four contacts 722, 725, 726 and 729 are relevant. It should be appreciated from the foregoing, it is significant that according to the embodiment shown, the reader 600 contains no active electronic components. Smart card 400 includes IC 530 having the active components required to transmit information to the host and receive information from the host. Power to operate the IC on the smart card is supplied from the port 130 via the connector 653. the cable 652 and the reader 600 when the smart card is inserted into the reader slot 651. Inserting the smart card 400 into the reader slot 651 causes contacts 722, 725, 726, and 729 on the smart card to couple with contacts 522, 525, 526, and 529 in the reader 600. The coupling of the smart card contacts with the reader contacts when the smart card is inserted into the reader slot supplies necessary power to the IC on the smart card and also enables necessary signals to flow between the IC and the host via the cable and the connector, using the USB.

Figure 9:
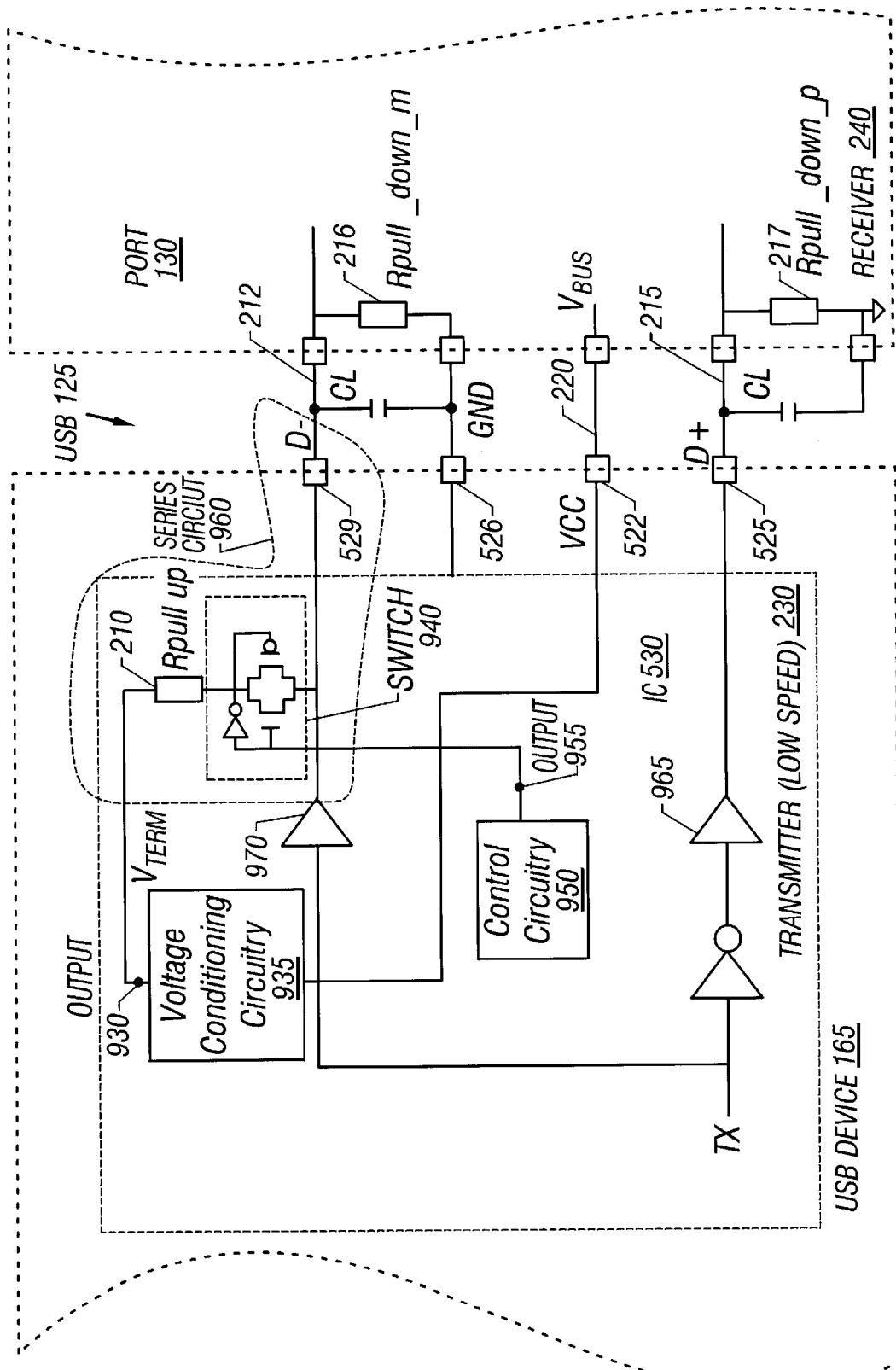
FIG. 9 illustrates aspects of a low speed USB device according to an embodiment.

FIG. 9 is a diagram showing an operation mode transfer system in accordance with an embodiment of the present invention. The embodiment in FIG. 9 illustrates a low speed USB device 165 coupled to the bus 125, which connects the device to a receiver 240 portion of a port 130 of a hub 110 connected to a host computer 170 (not shown).

The IC 530 includes a first driver 965 and second driver 970. The drivers are coupled to respective contacts 525 and 529 to drive signal lines D+ and D−, respectively, on the USB 125, at the USB low speed 1.5 MHz data transfer rate. Since the device in FIG. 9 is a low speed device, it has pull-up resistor 210 coupled to the D− differential signal line 212. According to the embodiment, the resistor 210 is an integrated device in the IC, rather than external. It is electrically coupled to the D− line 212 through the contact 529 of the smart card (not shown) and a switch 940. The resistor 210 is also coupled to an output 930 of voltage conditioning circuitry 935. The output 930, the resistor 210, and switch 940 are in a series circuit 960. The voltage conditioning circuitry is coupled to VCC contact 522, and the $V_{BUS}$ line 220, for receiving the $V_{BUS}$ supply voltage (nominally 5 volts) from the port 130, and generates a VTERM voltage supply (nominally 3.3 volts) particularly for the pull-up resistor 210.

The switch 940 is controlled by a signal at output 955 from control circuitry 950. The switch closes responsive to the signal on the output 955 of control circuitry 950 being asserted, which couples the voltage conditioning circuitry output 930 and resistor 210 to the contact 529, and thereby to the D– line 212. The switch 940 opens responsive to the signal on the output 955 of control circuitry 950 being deasserted, which decouples the voltage conditioning circuitry output 930 and resistor 210 from the contact 529, and thereby from the D– line 212.

Figure 13:
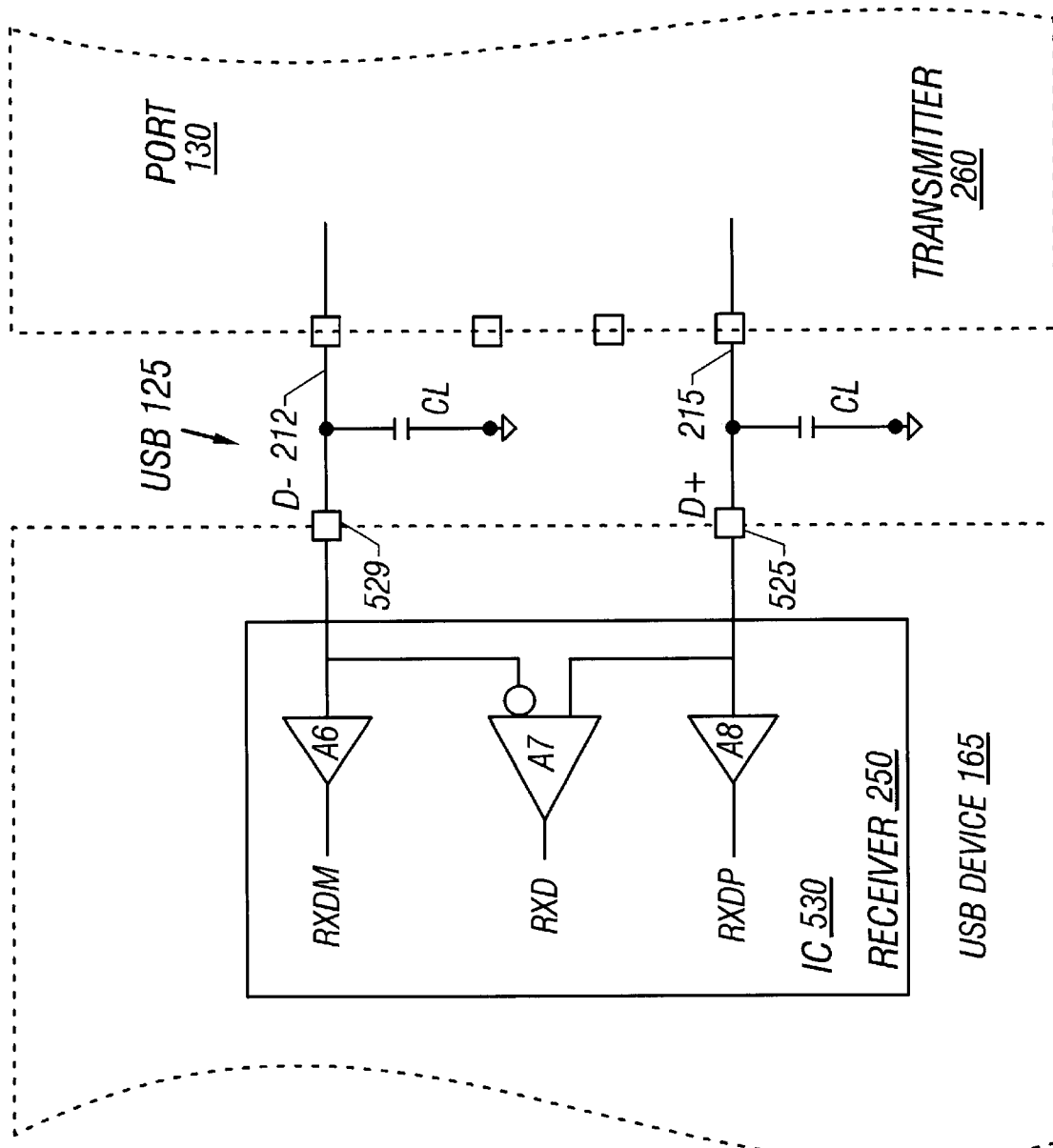
FIG. 13 illustrates additional aspects of a USB device according to an embodiment.

FIG. 13 illustrates a receiver 250 for a USB device 165 according, to an embodiment of the present invention. The receiver 250 includes a single input amplifier A6 on the IC 530, coupled to contact 529 for receiving a D– input signal from the host transmitter 260, a single input amplifier A8 on the IC 530, coupled to contact 525 for receiving a D+ input signal from the host transmitter 260, and a differential amplifier A7 on the IC 530, coupled to both the contacts for receiving both the D+ and D– input signals. According to one embodiment of the present invention, the device 165 includes both the receiver 250 of FIG. 13, and the low speed transmitter 230 of FIG. 9 described above. According to another embodiment, the device 165 includes both the receiver 250 of FIG. 13, and the full speed transmitter 230 of FIG. 10 described hereinbelow.

Figure 8:
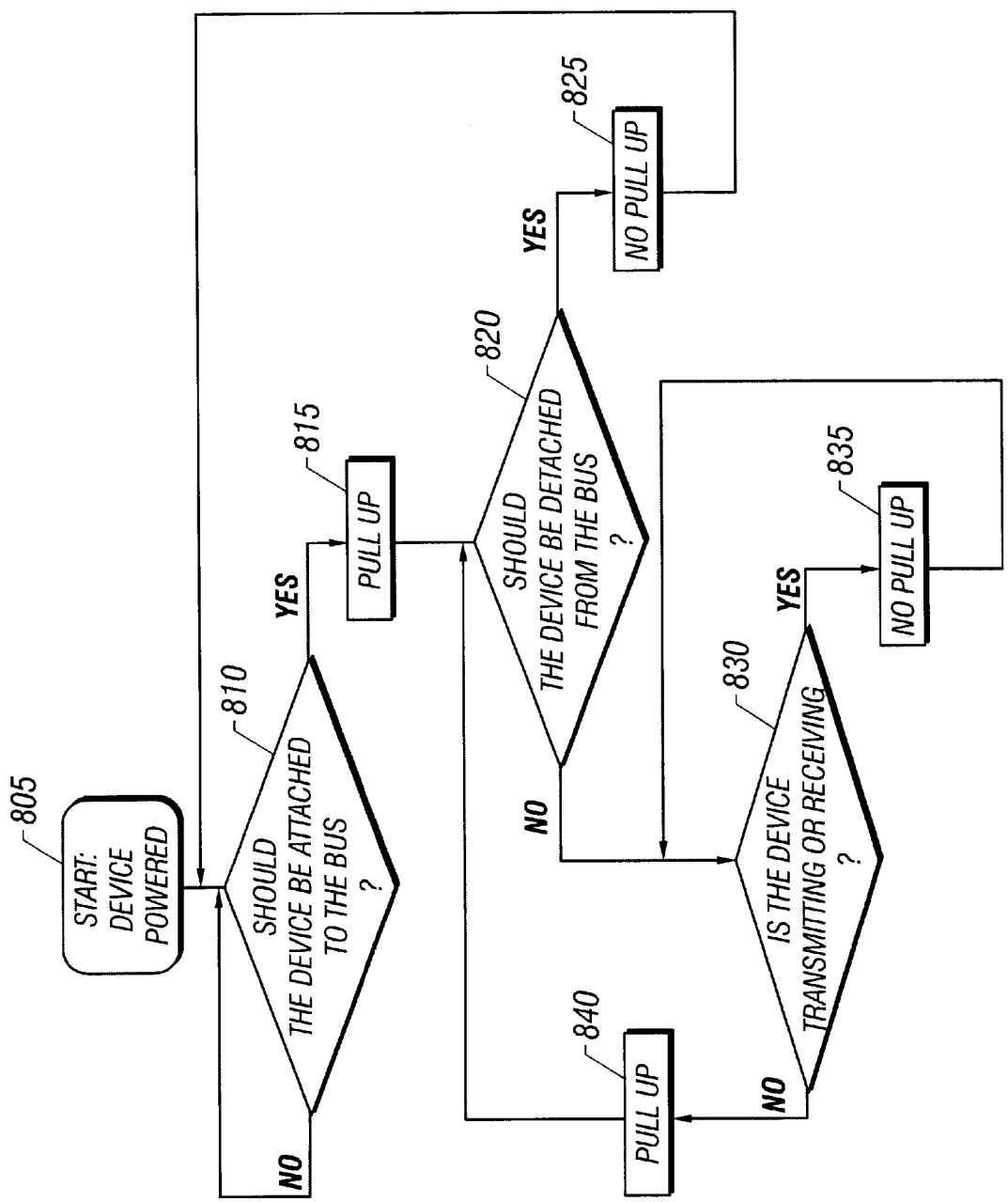
FIG. 8 illustrates, in flow chart format, logic for connecting and disconnecting a resistor on the integrated circuit module of FIG. 5.

Referring now to FIG. 8, logic is described for control circuitry 950 selectively connecting and disconnecting the pull up resistor 210 of device 165. At step 805, the device is inserted in reader 600, which is coupled to port 130, and the port 130 powers the device. Then, at step 810, control circuitry 950 determines whether the voltage level VBUS received by device 165 is adequate for the device to be attached to the bus 125, that is, whether the D– contact 529 should be pulled up to the voltage level VTERM of output 930 through resistor 210. If not, then the circuitry 950 continues to monitor, at step 810, until the voltage level $V_{BUS}$ is adequate. Once the control circuitry detects adequate voltage on $V_{BUS}$, an output signal on output 955 is asserted to close switch 940 and pull up the contact 529, at step 815. At this point, with signal line D– pulled up the device is capable of being detected by the host as a low speed USB device 165, and the device may communicate its identity to the host, and the host may enumerate the device.

Next, at step 820, the control circuitry determines whether there is any indication that the device should be detached, such as to be re-enumerated. If there is an indication that the device should be detached, at step 825 the circuitry 950 deasserts the signal at output 955, so that the contact 529 is no longer pulled up. If no, the circuitry continues to assert the signal at output 955 to hold up the voltage level of contact 529; provided, however, that once the control circuitry determines that the device is transmitting or receiving, i.e., transferring data between the host and the device at the USB low or full speed data rate, at step 830, the circuitry temporarily deasserts the signal on output 955, at step 835, and continues to monitor, at step 830, for transmitting or receiving to end. Once transmitting or receiving by the device has ended, control circuitry 950 re-asserts the signal on output 955, at step 840, to once again pull up the contact 529.

A result of this arrangement is that the switch is open during data transfers, causing the differential signal line D– to match the differential signal line, insofar as neither of the differential signal lines has a pull-up resistor connected, which results in improved differential signal quality. Also, the switch is closed during an interval when the device is powered and not transmitting, provided that there is no detachment demand, permitting the host to determine the operating mode of the device.

There may be numerous other conditions, not shown in FIG. 8, for deasserting the control circuitry output 955 signal in order to open the switch. For example, the switch 940 may also be used to decouple the pull up resistor 210 at times other than during data transmissions. Such additional detachments may be done, for example, to conserve power or to reduce communications overhead processing by the host, and are compatible with also decoupling the pull up resistor during data transmission. The switch may be opened during times when the $V_{BUS}$ voltage supply to the device is out of USB specifications, or if electrical contacts 522, 525, 526 or 529 of device 165 are not properly coupled to the USB. Instances when the voltage is too unstable or too low for reliable operation may be sensed by the control circuitry 950, based on a test for voltage on the VCC contact 529, and presence of pull-down resistors 216 and 217. Reasons for attachment and detachment are further described in the USB Specification.

Figure 11:
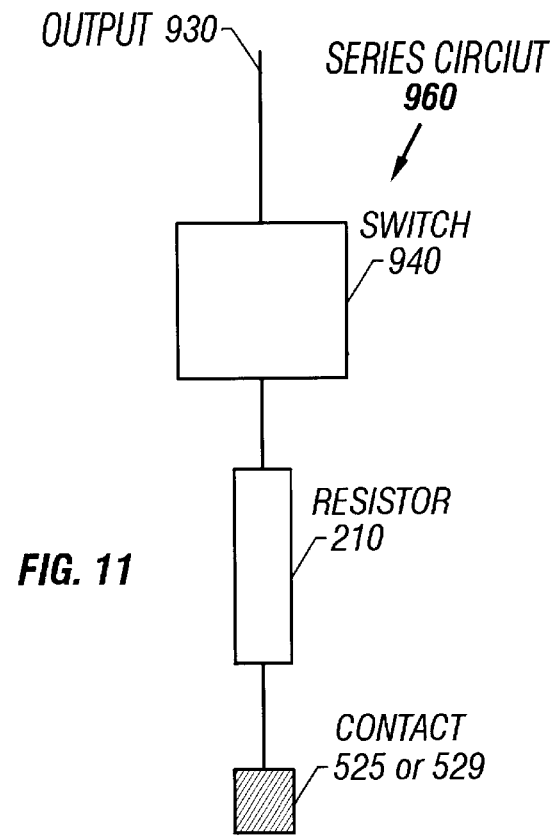
FIG. 11 shows an alternative embodiment of a series circuit of FIGS. 8 and 9.

Many of the above described features can be achieved independently of the order of connection of the resistor and the switch between the $V_{TERM}$ voltage and the D– signal line 212. Accordingly, in another embodiment of the present invention shown in FIG. 11, the series circuit 960 is modified such that the order of connection of the resistor 210 and the switch 940 is reversed. That is, the resistor 210 is connected to the switch 940 on one side and to one of the contacts 525 or 529 on the other side, and the switch 940 is connected to the resistor 210 and to the output 930 on the other side. The output 930 is connected to the voltage conditioning circuitry 935 (FIG. 9).

The order of connection as shown in FIG. 9 is advantageous in that this arrangement results in improved IC protection against ESD. The Maemura et al. patent discloses a switch and resistor for a USB device coupled in the reverse order of resistor and switch shown in FIG. 9 herein. Furthermore, the resistor as disclosed in the "Maemura et al. patent" is not integrated in the device IC, as in the present invention, which presents difficulties in the context of smart cards, as has been described hereinabove. Also, according to Maemura et al. the switch is open while the device is in the inoperative state, but closed when the device is communicating with the host; whereas, according to the present invention the switch is open while the device is communicating.

In another embodiment of the present invention, the switch 940 is replaced by an array of switches connected to multiple control signals, from control circuitry like circuitry, to implement more complex logic functions causing the switch to be open. In one embodiment, a second switch, like switch 940 in FIG. 9, is placed between the $V_{TERM}$ voltage and the resistor 210, such that the resistor is connected to a switch on either side.

Figure 10:
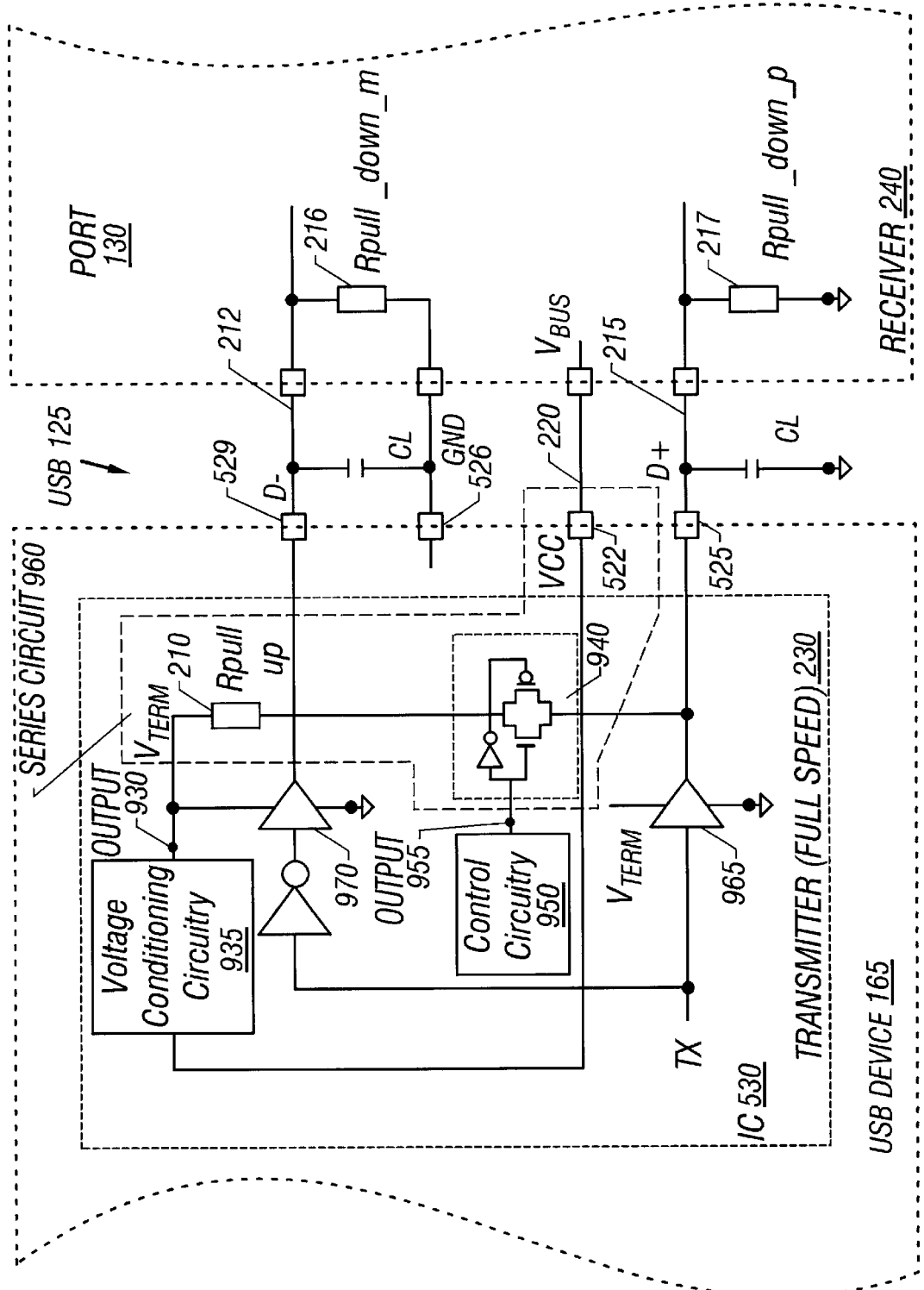
FIG. 10 illustrates aspects of a full speed USB device according to an embodiment.

Referring now to FIG. 10, an embodiment is shown of an operation mode transfer system, in accordance with the present invention, for a USB device 165 of the full speed variety coupled via USB 125 to a port 130 of hub 110 (FIG. 1). In the device of FIG. 10 pull-up resistor 210 is coupled to contact 525, and thereby to the differential signal line 215, through switch 940. The resistor is also connected to the voltage conditioning circuitry output 930 voltage $V_{TERM}$, so that for a full speed device as shown in FIG. 10, the host 170 detects that V$_{TERM}$ is present on the signal line D+, which determines the presence of a device of the full speed variety. Aside from the data transfer rate, and the resistor 210 being coupled to the D+ contact 525, instead of the D− contact 529, the full speed device of FIG. 10, operates like that of the low speed device of FIG. 9.

Figure 2:
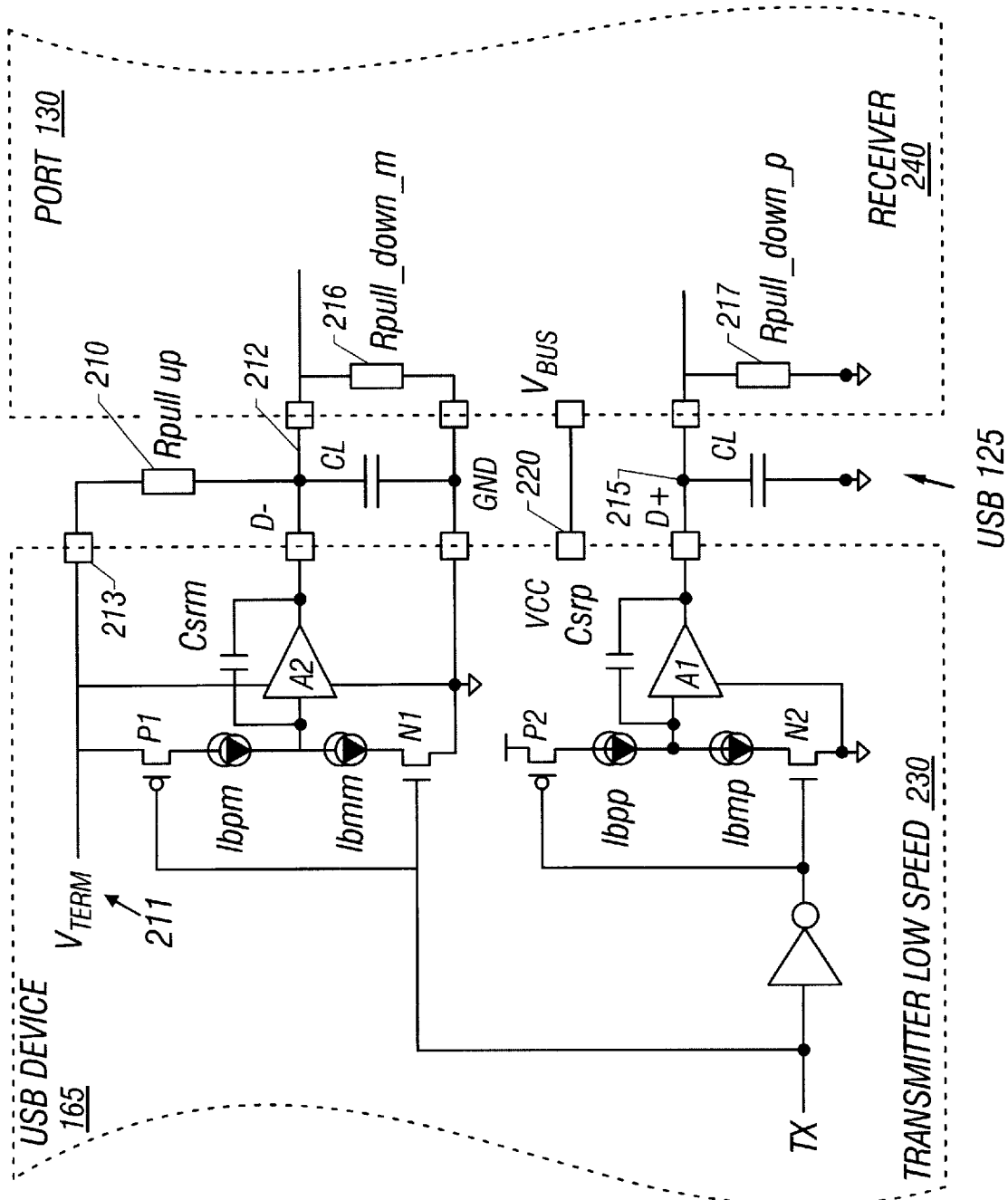
FIG. 2 is a typical prior art configuration for a USB low speed device.
Figure 3:
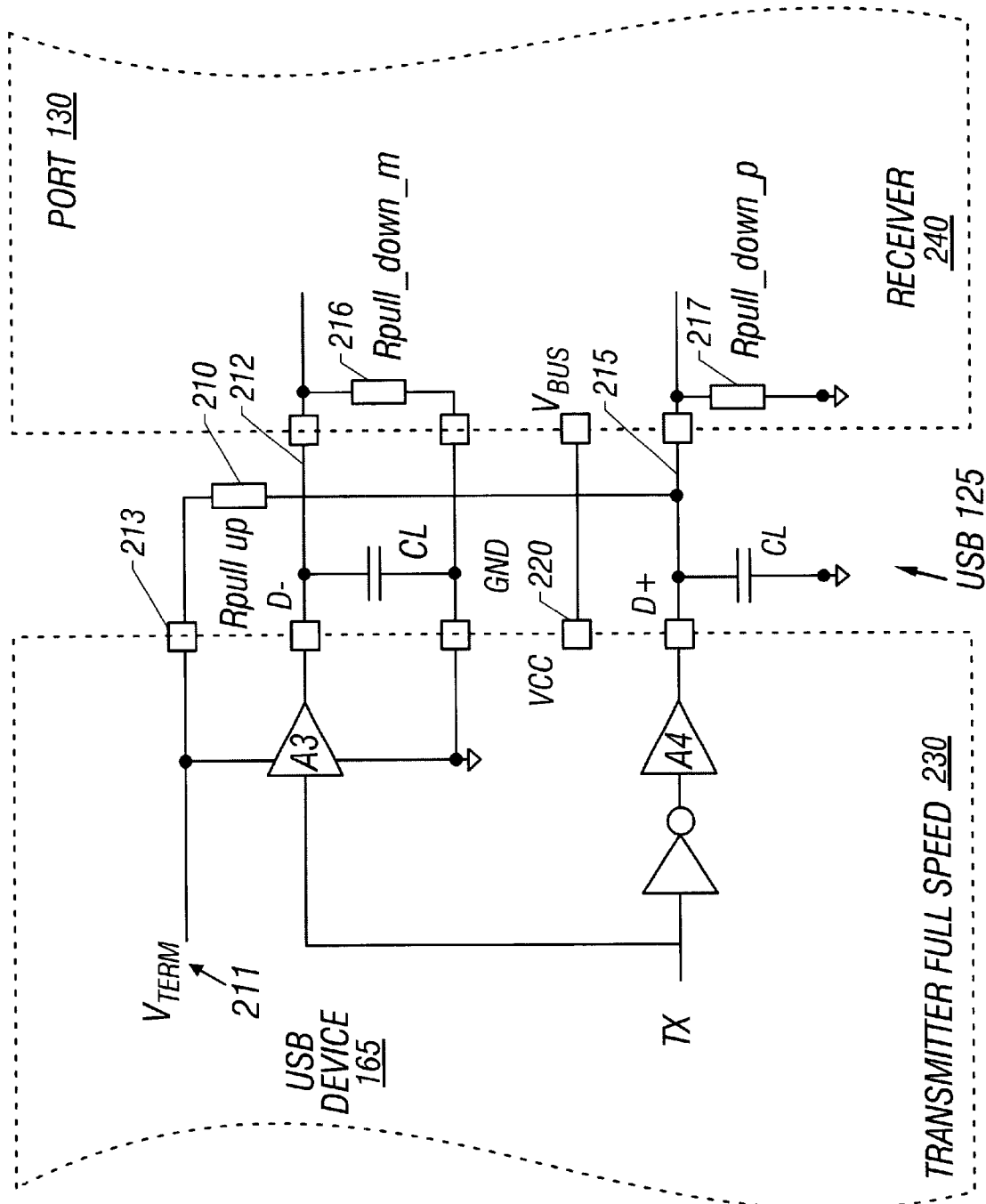
FIG. 3 is a typical prior art configuration for a USB full speed device.

As was stated hereinabove, legacy issues limit the number of terminals which are available for smart cards, and this also gives rise to difficulties in connecting an external resistor to a smart card for a USB application. To elaborate, smart cards in widespread use are conventionally manufactured according to ISO7816 Specifications, which specifies the location and function of the electrical terminals on the cards as well as protocol. The six contacts, 522, 523, 524, 526, 527 and 528 shown in FIG. 5 for the smart card of FIG. 4 are currently used for functions defined according to the ISO7816 Specifications. The other two contacts 525 and 529 are designated by the ISO standard as being "reserved."(In one of the embodiments, it is assumed that the smart card is performing as a USB device when inserted in a reader 600. Mode selection between USB and ISO7816, if any, is not described herein.) However, as shown in FIGS. 2 and 3, it is conventional for a USB device 165 to have the required pull-up resistor mounted externally, which requires either i) circuitry in the device package, such as internal to an IC in the device, to condition the voltage VCC to supply the proper voltage level, i.e., a different voltage level than, for the pull-up resistor 210, in which case an extra terminal 213 is also required for the voltage VCC supplied to the resistor, or else ii) external circuitry coupled to the terminal for conditioning the voltage to supply for the pull-up resistor.

Figure 12:
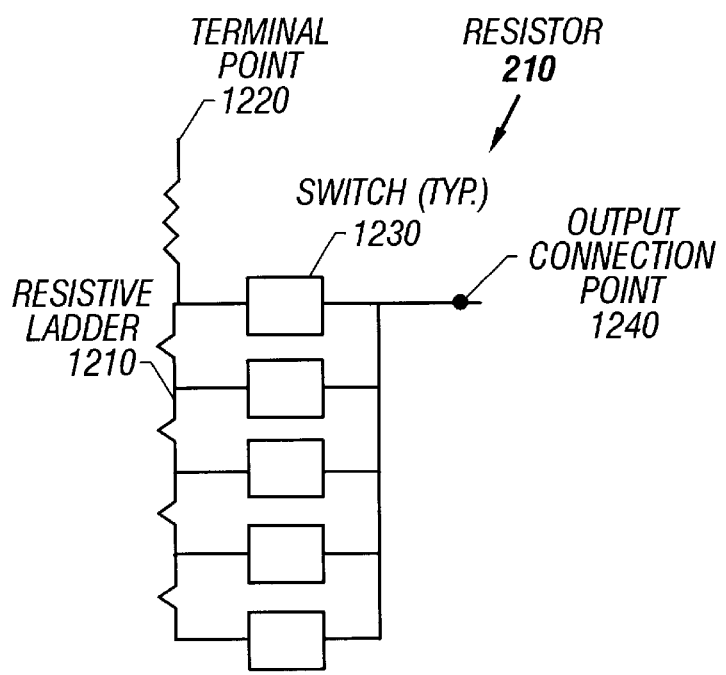
FIG. 12 shows details of the integrated resistor of FIG. 9 and FIG. 10.

One issue that arises from integrating the resistor on the IC, according to the present invention, concerns how to manufacture the resistor to sufficiently precise tolerances. That is, the USB Specification calls for the resistor to be within a predetermined tolerance range, which is narrower than conventionally achieved by ordinary fabrication methods. FIG. 12 illustrates the pull-up resistor 210, which includes a resistive ladder 1210 (or simply "resistor") integrated on the IC 530 (FIG. 5), having a structure suited for meeting the USB Specification tolerance limit. Resistive ladder 1210 is connected to a terminal point 1220 and to several switches 1230 distributed along the length of the resistive ladder. One of the switches 1230 is connected between the resistive ladder and the output connection point 1240 and the remaining switches 1230 are opened. The selection of which switch 1230 to connect is determined by testing at the time of manufacture of the device and stored in non volatile memories. This structure and method allows a resistor with an acceptable resistance tolerance to be fabricated with a process that produces resistive material varying widely in resistance per square unit. In an alternative embodiment, the switches are replaced with other suitable devices, such as fusable links.

The description of the present embodiment has been presented for purposes of illustration, but is not intended to be exhaustive or to limit the invention to the form disclosed. Many modifications and variations will be apparent to those of ordinary skill in the art. The embodiment was chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. An apparatus for communicating with a host, comprising:
   a card;
   an integrated circuit ("IC") affixed to the card, wherein the IC is coupled to a number of contacts, including a first output of the IC being coupled to a first one of the contacts, wherein a resistor of the IC is coupled to the first one of the contacts, and the IC includes voltage conditioning circuitry coupled to a second one of the contacts to receive a voltage supply, wherein the voltage conditioning circuitry is capable of generating an output voltage selectively coupled to the first contact, to selectively pull up the first contact to the output voltage through the resistor, so that attachment of the apparatus is capable of being detected, by the host detecting the output voltage on the first contact.

2. The apparatus of claim 1, wherein the apparatus comprises:
   a switch on the IC coupled in a series circuit, the series circuit including the voltage conditioning circuitry output, the resistor and the first contact; and
   control circuitry on the IC for selectively pulling up or not pulling up the first contact to the output voltage of the voltage conditioning circuitry through the resistor and the switch.

3. The apparatus of claim 2, wherein the control circuitry is capable of selecting whether to pull up the first contact to the output voltage of the voltage conditioning circuitry, responsive to the apparatus being powered.

4. The apparatus of claim 3, comprising:
   a second output of the IC coupled to a third one of the contacts, wherein the control circuitry decouples the first contact from the voltage conditioning circuitry output voltage, responsive to data transfer between the apparatus and the host, so that an imbalance is reduced for signals on the first and second outputs, respectively.

5. The apparatus of claim 4, wherein the control circuitry is capable of decoupling the first contact from the resistor.

6. The apparatus of claim 1, comprising a reader having a first connector for connection to a port, and a second connector for receiving the card and electrically coupling to the contacts.

7. The apparatus of claim 6, wherein the reader has solely passive electronic components.

8. The apparatus of claim 7, wherein the second connector has passthrough contacts.

9. The apparatus of claim 1, wherein the resistor has a certain length, and is coupled to a number of impedance-value-selecting switches distributed along its length, so that the resistor is capable of being coupled through a selected one of the impedance-value-selecting switches to the first contact, for selectively varying impedance of the resistor.

10. An apparatus for communicating with a host, comprising:
    a card;
    an integrated circuit ("IC") affixed to the card, wherein the IC is coupled to a number of contacts, including a first output of the IC being coupled to a first one of the contacts, wherein a resistor of the IC is coupled to the first one of the contacts, and the IC includes voltage conditioning circuitry coupled to a second one of the contacts for receiving a voltage supply from the host, and wherein the voltage conditioning circuitry has an output coupled to the resistor, so that attachment of the apparatus is capable of being detected by the host;

wherein a switch on the IC is coupled in a series circuit, the series circuit including the voltage conditioning circuitry output, the resistor and the first contact, and wherein the IC comprises:

control circuitry for selectively pulling up or not pulling up the first contact to the output of the voltage conditioning circuitry through the resistor and the switch; and wherein the apparatus further comprises:

a reader, having a connector for connection to a port, and a passthrough connector for receiving the card and coupling to the contacts, wherein electrical components of the reader consist solely of passive components.

11. The apparatus of claim 10, wherein the control circuitry is capable of selectively pulling up the first contact to the output voltage of the voltage conditioning circuitry, responsive to the apparatus being powered.

12. The apparatus of claim 11, comprising:

a second output of the IC coupled to a third one of the contacts, wherein the control circuitry is capable of decoupling the first contact from the voltage conditioning circuitry output voltage, responsive to data transfer between the apparatus and the host, so that an imbalance is reduced for signals on the first and third contacts, respectively.

13. The apparatus of claim 12, wherein the control circuitry is capable of decoupling the first contact from the resistor.

14. A method for communicating with a host, comprising the steps of:

a) receiving a voltage at a first voltage level, on a first contact of a number of contacts coupled to an integrated circuit ("IC"), wherein the voltage is conditioned, by voltage conditioning circuitry of the IC to generate an output voltage at a second voltage level; and b) pulling up the second contact to the second voltage level, through a resistor of the IC coupled to the voltage conditioning circuitry output voltage and the second contact, so that attachment of an apparatus that includes the IC is capable of being detected by the host.

15. The method of claim 14, wherein the second contact is pulled up to the second voltage level through a switch on the IC, responsive to the apparatus being powered.

16. The method of claim 15, comprising the step of decoupling the second voltage level from the second contact by the switch, responsive to a detach indication from control circuitry of the IC.

17. The method of claim 15 comprising the steps of:

driving or receiving a first signal by a first driver or a first receiver on the IC for transmitting to the host, the signal being asserted on the second contact;

driving or receiving a second signal by a second driver or a second receiver for transmitting to the host or receiving from the host, the signal being asserted on a third one of the contacts; and decoupling the second voltage level from the second contact by a switch on the IC, responsive to the apparatus transmitting or receiving, to reduce an imbalance for the first and second signals.

18. The method of claim 17, comprising the step of re-connecting the second voltage level to the second contact by the switch, responsive to termination of the transmitting.

19. The method of claim 14, wherein step a) comprises the step of:

electrically coupling a connector of a reader to the contacts, for coupling the IC to the host, wherein the reader solely has passive components.

20. An apparatus for communicating with a host comprising:

an integrated circuit ("IC") coupled to a first contact and having a first driver and a first receiver, so that the IC is capable of generating a first output signal to and receiving a first input signal from the first contact for communicating with a host, wherein the IC has a voltage reference, an integrated resistor and a switch coupled in series with the first contact, and the switch is capable of coupling the first voltage reference to the first contact responsive to the apparatus being powered, in order to signal attachment to the host.

21. The apparatus of claim 20, wherein the switch is capable of decoupling the voltage reference from the first contact responsive to the apparatus transmitting or receiving.

22. The apparatus of claim 20, wherein the switch is capable of decoupling the voltage reference from the first contact in order to signal detachment of the apparatus to the host.

23. The apparatus of claim 21 or claim 22, comprising:

a second contact for receiving a voltage, the second contact being coupled to voltage conditioning circuitry on the IC for generating the voltage reference from the received voltage.

24. The apparatus of claim 23, wherein the IC comprises a second driver and a second receiver, so that the IC is capable of generating a second output signal and receiving a second input signal, and the apparatus comprises a third contact coupled to the IC second output and input signals, for communicating with the host, and a fourth contact coupled to the IC, for coupling the host and the IC with an electrical common voltage, the apparatus being capable of communicating with the host through contacts of the apparatus consisting solely of the four contacts.

25. A method for communicating between an apparatus and a host comprising the steps of:

coupling a voltage reference by a switch through a resistor in an integrated circuit ("IC") of the apparatus to a first contact coupled to the IC, so that the host can detect attachment of the apparatus, wherein the coupling is responsive to the IC being powered;

asserting first and second output signals by the IC, for transmitting to the host, the first signal being asserted on the first contact and the second signal being asserted on a second contact coupled to the IC; and decoupling the voltage reference of the IC from the first contact, by the switch in the IC, wherein the decoupling is responsive to the IC transmitting or receiving.

26. The method of claim 25, wherein the IC and the contacts are affixed to a card, the method comprising the steps of:

electrically coupling the host to the IC via a passthrough connector of a reader, the reader having solely passive components, wherein the coupling includes coupling the host to the contacts for the respective first and second signals.

27. The method of claim 25 wherein the step of electrically coupling the host via the passthrough connector to the IC comprises coupling power and ground signals from the host to respective third and fourth contacts and coupled to the IC.

* * * * *